(12) United States Patent
Kakarala et al.

(10) Patent No.: US 7,037,979 B2
(45) Date of Patent: May 2, 2006

(54) THERMOPLASTIC POLYOLEFIN COMPOSITIONS AND METHODS OF PREPARING THERMOPLASTIC POLYOLEFIN COMPOSITIONS FOR SOFT SHEET APPLICATIONS

(75) Inventors: Srimannarayana Kakarala, Bloomfield Hills, MI (US); Sandip R. Patel, Miamisburg, OH (US); Thomas S. Ellis, Romeo, MI (US)

(73) Assignee: Delphi Technologies, Inc., Troy, MI (US)

( * ) Notice: Subject to any disclaimer, the term of this patent is extended or adjusted under 35 U.S.C. 154(b) by 206 days.

(21) Appl. No.: 10/234,552

(22) Filed: Sep. 4, 2002

(65) Prior Publication Data

US 2004/0044111 A1    Mar. 4, 2004

(51) Int. Cl.
*C08L 23/10*    (2006.01)
*C08L 25/04*    (2006.01)
*C08L 45/00*    (2006.01)

(52) U.S. Cl. .................. 525/240; 525/241; 525/232; 525/211; 524/492; 524/445; 524/451

(58) Field of Classification Search .......... 525/236, 525/232, 240, 241, 210, 211; 524/445, 451
See application file for complete search history.

(56) References Cited

U.S. PATENT DOCUMENTS

| | | | | |
|---|---|---|---|---|
| 4,258,145 A | * | 3/1981 | Wright | 525/99 |
| 5,212,239 A | * | 5/1993 | Mallikarjun | 525/74 |
| 5,310,794 A | * | 5/1994 | DeNicola et al. | 525/71 |
| 5,321,080 A | * | 6/1994 | Kumano et al. | 525/79 |
| 5,596,042 A | * | 1/1997 | Itoh et al. | 525/98 |
| 5,763,532 A | * | 6/1998 | Harrington et al. | 525/194 |
| 5,840,229 A | * | 11/1998 | Sugimoto et al. | 264/142 |
| 5,886,068 A | * | 3/1999 | Prout et al. | 523/220 |
| 5,948,850 A | * | 9/1999 | Enami et al. | 524/515 |
| 5,977,259 A | * | 11/1999 | Sugimoto et al. | 525/232 |
| 6,072,004 A | * | 6/2000 | Migchels et al. | 525/191 |
| 6,090,888 A | * | 7/2000 | Khanarian et al. | 525/88 |
| 6,100,334 A | * | 8/2000 | Abdou-Sabet | 525/191 |
| 6,153,680 A | | 11/2000 | Shah et al. | 524/425 |
| 6,218,474 B1 | * | 4/2001 | Valligny et al. | 525/194 |
| 6,237,244 B1 | | 5/2001 | Bryan et al. | 34/59 |
| 6,316,068 B1 | * | 11/2001 | Masubuchi et al. | 428/35.7 |
| 6,316,090 B1 | * | 11/2001 | Sugimoto et al. | 428/304.4 |
| 6,335,095 B1 | * | 1/2002 | Sugimoto et al. | 428/402 |
| 6,506,495 B1 | * | 1/2003 | Enami et al. | 428/424.8 |
| 6,541,568 B1 | * | 4/2003 | Ding et al. | 525/88 |
| 6,593,002 B1 | | 7/2003 | Shah et al. | 428/500 |

FOREIGN PATENT DOCUMENTS

| | | | |
|---|---|---|---|
| EP | 0704465 | | 3/1996 |
| JP | 2000-159944 A | * | 6/2000 |
| WO | 0026103 | | 11/2000 |

OTHER PUBLICATIONS

JP 2000-159944 (translation in English).*
European Search Report for European Patent Application No. EP03077631.

* cited by examiner

*Primary Examiner*—Ling-Sui Choi
*Assistant Examiner*—Rip A. Lee
(74) *Attorney, Agent, or Firm*—Scott A. McBain

(57) ABSTRACT

Thermoplastic polyolefin compositions and a process for preparing the same are provided comprising a blend of polypropylene, and styrenic elastomer. The compositions may further comprise ethylene copolymer elastomer, polymer additive, such as polymer surface modifier, powder flow additive, stabilizer and/or color pigment. The compositions are particularly applicable for use in a slush molding process where low melt viscosity is desired to form improved surface quality thermoplastic polyolefin skin. A process is disclosed for preparing thermoplastic polyolefin into a slush moldable powder by melt compounding the composition to form pellets, and further processing the pellets by cryogenic pulverization or by extruding micropellets in one step using a gear pump to increase the melt pressure.

26 Claims, 2 Drawing Sheets

THERMOPLASTIC POLYOLEFIN COMPOSITIONS AND METHODS OF PREPARING THERMOPLASTIC POLYOLEFIN COMPOSITIONS FOR SOFT SHEET APPLICATIONS

TECHNICAL FIELD

The present invention relates generally to thermoplastic polyolefin compositions for soft sheet applications and more specifically to thermoplastic polyolefin compositions for slush molding.

BACKGROUND OF THE INVENTION

Thermoplastic polyolefin compositions are actively pursued as replacement materials for polyvinyl chloride based skin materials for the fabrication of many articles. In the automotive field, thermoplastic polyolefin compositions have been used for the fabrication of articles such as interior sheathing, including instrument panel skins, door panels, air bag covers and seat covers.

Many of the articles have surface appearances and designs having complex surface characteristics, such as contours and geometric technical grains, and may be produced in a slush molding process. However, the balance of material properties desired for a slush molding process is difficult to achieve with current thermoplastic polyolefin compositions. Current thermoplastic polyolefin compositions are often processed for prolonged time periods at extremely high temperatures to form a fused skin in a slush molding process. The material composition of such a typical thermoplastic polyolefin composition may degrade during processing which in turn may alter the material properties, such as the material strength and uniform fusion of the composition. As a result, articles produced using these thermoplastic polyolefin compositions may have unacceptable surface appearance and mechanical properties. To achieve suitability for slush molding without material property degradation, thermoplastic polyolefin compositions with a very low melt viscosity during the molding process are desired. Herein we refer to melt viscosity at any given temperature as that property measured at low shear rates, such as that defined by zero shear rate viscosity. The melt viscosity of the thermoplastic polyolefin compositions for use in slush molding should be, but are not limited to, in the range of 50 Pa·s to 250 Pa·s over the processing temperature range of 180° C. to 260° C. as measured at low shear rate such as that applied by parallel plate rheometer Thus there is a need in the art for a thermoplastic polyolefin composition having a low melt viscosity at the molding temperature for use in slush molding. There is a further need for a thermoplastic composition having improved material properties, such as uniform melt fusion, during the slush molding process. There is still further need to convert the composition into a suitable powder (avg. particle size in the range of 75 μm to 400 μm) and/or micropellet form, (avg. particle size in the range of 300 μm to 900 μm), with a good mechanical flow during the slush molding process. There is a further need in the art for a process for preparing such a composition for use in manufacturing automotive and non-automotive articles with improved surface characteristics and appearance.

SUMMARY OF THE INVENTION

Described herein are thermoplastic polyolefin compositions and processes for preparing the composition, and articles of manufacture prepared from the composition. In one embodiment, a thermoplastic polyolefin composition is disclosed comprising a blend of about 20 weight percent (hereafter "wt. %") to about 50 wt. % polypropylene; and about 20 wt. % to about 60 wt. % of a styrenic elastomer, such as a hydrocarbon-styrenic copolymer elastomer. The weight percent values disclosed are based on the weight of the total composition unless otherwise noted.

In an alternative embodiment the thermoplastic polyolefin compositions further comprise up to about 30 wt. % ethylene copolymer elastomer. In another embodiment of the thermoplastic polyolefin, compositions comprise up to about 5 wt. % polymer additive, such as polymer surface modifier. Polymer surface modifiers may be used to achieve specific properties such as scratch resistance, and to improve melt flow properties by reducing the surface friction and enhancing the scratch resistance. In another embodiment, the thermoplastic polyolefin compositions comprise up to about 10 wt. % powder flow additive, such as inorganic particulate. Suitable powder flow additive may include hydrated silicate such as talc and montmorillonite clay. In an additional embodiment, the thermoplastic polyolefin compositions comprise about 1 wt. % to about 4 wt. % stabilizer. In a further embodiment, the thermoplastic polyolefin compositions comprise about 1 wt. % to about 2 wt. % color pigment. The stabilizer and color pigment are present in an amount effective to impart the desired color intensity and provide long term durability to the composition and the molded article.

In another embodiment, a process for the preparation of a thermoplastic polyolefin composition is provided comprising melt blending about 20 wt. % to about 50 wt. % polypropylene; and about 20 wt. % to about 60 wt. % styrenic elastomer. The resultant compositions may be processed into various forms, including, but not limited to, pellets, micropellets and powder. In another embodiment, the process comprises melt blending the forgoing compositions with up to about 30 wt. % ethylene copolymer elastomer. In an additional embodiment, the process comprises melt blending the foregoing compositions with up to about 5 wt. % polymer additive, such as polymer surface modifier. In an additional embodiment, the process comprises the foregoing compositions with up to about 10 wt. % powder flow additive, such as inorganic particulate. Suitable powder flow additive may include hydrated silicate such as talc and montmorillonite clay. In a further embodiment the process comprises melt blending the foregoing compositions with about 1 wt. % to about 4 wt. % stabilizer. Alternatively, the process comprises melt blending the foregoing compositions with about 1 wt. % to about 2 wt. % color pigment. In another embodiment, the process further comprises processing the pellets formed from the foregoing compositions to form particles. The particles may be in the form of powder, micropellet, or a combination of powder and micropellet, or other applicable form depending on the desired application.

In another embodiment, articles of manufacture prepared with the present compositions are provided.

These and other features and advantages will be apparent from the following brief description of the drawings, detailed description, and appended claims and drawings.

BRIEF DESCRIPTION OF THE DRAWINGS

Referring now to the drawings which are meant to be exemplary, not limiting.

DETAILED DESCRIPTION OF THE PREFERRED EMBODIMENT

Figure 1:
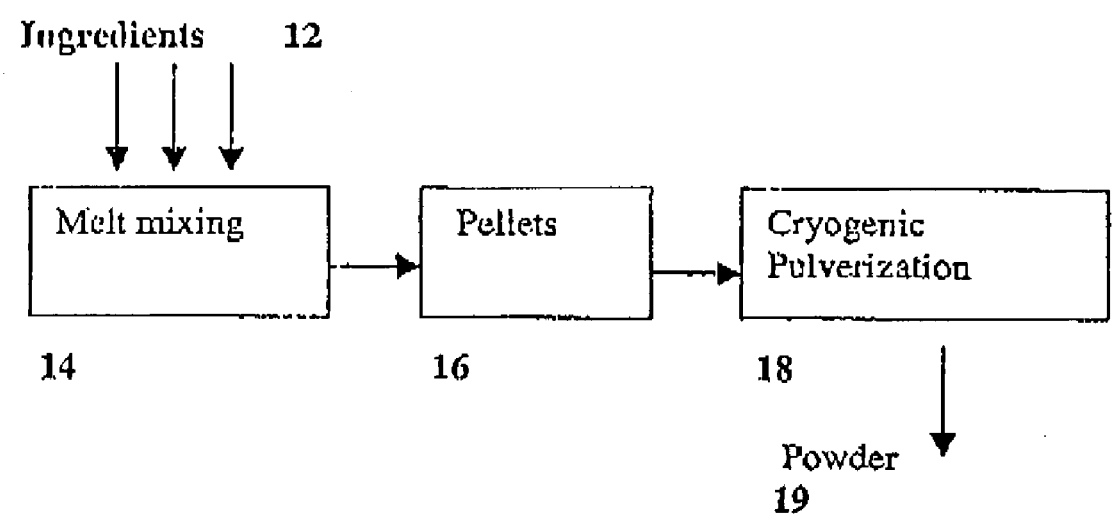
FIG. 1 is a schematic depiction of a process of compounding thermoplastic polyolefin composition to form a powder in accordance with the present invention.

Described herein are thermoplastic polyolefin compositions and processes for preparing the same. The present invention also relates to articles of manufacture prepared from the compositions. In one embodiment, a thermoplastic polyolefin composition is disclosed comprising a blend of about 20 wt. % to about 50 wt. % polypropylene; and about 20 wt. % to about 60 wt. % styrenic elastomer. The melt viscosity of the thermoplastic polyolefin compositions for use in slush molding should be, but are not limited to, in the range of 50 Pa·s to 250 Pa·s over the processing temperature range of 180° C. to 260° C. as measured at low shear rate such as that applied by parallel plate rheometer. High Melt Flow Index (as measured according to ASTM D1238) materials with Melt Flow Index (MFI) greater than about 20 grams/10 minutes (g/10 min) measured at 230° C. employing a 2.16 kilogram (kg) weight (>20 g/10 min) are selected to obtain low melt viscosity of the composition. Also, polymers are selected for blend compatibility and/or miscibility (mutual solubility) to provide compositions with the desired low melt viscosity and improved flow properties.

Unless otherwise indicated, all numbers expressing quantities of ingredients, properties such as molecular weight, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

In an alternative embodiment, the thermoplastic polyolefin compositions further comprise up to about 30 wt. % ethylene copolymer elastomer. In another embodiment, the thermoplastic polyolefin compositions further comprise up to about 5 wt. % polymer additive, such as polymer surface modifier. In an additional embodiment, the thermoplastic polyolefin compositions further comprise up to 10 wt. % powder flow additive, such as inorganic particulate. Suitable powder flow additive may include hydrated silicate such as talc and montmorillonite clay. In an additional embodiment, the thermoplastic polyolefin compositions further comprise about 1 wt. % to about 4 wt. % stabilizer. In another embodiment, the thermoplastic polyolefin compositions further comprise about 1 wt. % to about 2 wt. % color pigment. Optionally, light stabilizer, UV absorber and other agents may be incorporated in an amount effective to enhance color retention with solar exposure during product service.

The polypropylene component of the thermoplastic polyolefin compositions comprises about 20 wt. % to about 50 wt. %, more preferably about 25 wt. % to about 35 wt. %, polypropylene. Suitable polypropylene includes, but is not limited to, crystalline polypropylene and is intended to include in addition to the homopolymer those polymers that also contain minor amounts, usually not greater than about 15 wt. % based on the total weight of the polypropylene, of other olefin monomers, for example ethylene, butene, octene and the like. Suitable polypropylene polymers have melt flow indices in the range of about 60 to about 1200 grams/10 minutes (g/10 min.) measured at 230° C. employing a 2.16 kilogram (kg) weight.

The thermoplastic polyolefin compositions further comprise about 20 wt. % to about 60 wt. %, preferably about 25 wt. % to about 45 wt. % styrenic elastomer, usually in the form of random or block copolymer with a molecular styrene content below 50 wt. % based upon the total weight of the styrenic elastomer and the reminder being made up of saturated aliphatic hydrocarbon polymer or copolymer.

The thermoplastic polyolefin compositions may comprise up to about 30 wt. %, preferably about 15 wt. % to about 25 wt. %, ethylene copolymer elastomer, such as ethylene-based rubber. Suitable ethylene copolymer elastomers include, but are not limited to, ethylene-propylene, ethylene-butene, ethylene-octene, ethylene-pentene, ethylene-hexene copolymers and the like, as well as combinations comprising at least one of the forgoing ethylene copolymer elastomers, having glass transition temperatures of about down to −70° C. or less. Other suitable ethylene copolymer elastomers include ethylene-propylene non-conjugated diene copolymer (EPDM). The non-conjugated dienes contain about 6 to about 22 carbon atoms and have at least one readily polymerized double bond. The ethylene-propylene copolymer elastomer contains about 60 wt. % to about 80 wt. %, usually about 65 wt. % to about 75 wt. % ethylene, based on the total weight of the EPDM. The amount of non-conjugated diene is generally about 1 wt. % to about 7 wt. %, usually about 2 wt. % to about 5 wt. %, based on the total weight of the EPDM. Preferably, the ethylene-propylene copolymer elastomer is EPDM copolymer. Suitable EPDM copolymers include, but are not limited to, ethylene-propylene-1,4 hexadiene, ethylene-propylene dicyclopentadiene, ethylene-propylene norbornene, ethylene-propylene-methylene-2-norbornene, and ethylene-propylene-1,4-hexadiene/norbornadiene copolymer.

The thermoplastic polyolefin compositions may further optionally comprise up to about 5 wt. % polymer additive. Suitable polymer additives include polymer surface modifier to improve scratch resistance, such as fatty acid amides like oleamide and erucamide, and siloxane. The thermoplastic polyolefin compositions may be comprised of up to about 5 wt. %, preferably about 0.3% to about 1 wt. %, of polymer surface modifier.

In an additional embodiment, the thermoplastic polyolefin compositions further comprise up to 10 wt. %, preferably about 3 wt. % to about 7 wt. %, powder flow additive, such as inorganic particulate. Suitable powder flow additive includes hydrated silicate such as talc and montmorillonite clay. The particle size range of the silicate should be in the range of about 1 to about 40 μm and preferably in the range of about 1 to about 20 μm.

The thermoplastic polyolefin compositions can also optionally comprise stabilizer, such as heat stabilizer, light stabilizer and the like, as well as combinations comprising at least one of he foregoing stabilizers. Heat stabilizers include phenolics, hydroxyl amines, phosphates, ands the like, as well as combinations comprising at least one of the foregoing heat stabilizers. Light stabilizers include low molecular weight (having number-average molecular weights less than about 1,000 AMU) hindered amines, high molecular weight (having number-average molecular weights greater than about 1,000 AMU) hindered amines, and the like, as well as combinations comprising at least one of the foregoing light stabilizers. Optionally, various additives known in the art may be used as needed to impart various properties to the composition, such as heat stability, stability upon exposure to ultraviolet wavelength radiation, long term durability, and processability. The exact amount of stabilizer is readily empirically determined by the reaction employed and the desired characteristics of the finished article, having about 1 wt. % to about 4 wt. %, preferably about 1 wt. % to about 3 wt. %, stabilizer.

Table 1 provides a list of components suitable for use in the thermoplastic compositions and examples discussed herein. It will be understood that the components listed in Table 1 are given for the purpose of illustration and do not limit the invention.

TABLE 1

| Component | Source | Trade Name |
|---|---|---|
| Polypropylene | Basell, Equistar, Exxon Huntsman | Profax ®, Valtec ® Petrothene ®, Escorene ® |
| Ethylene Copolyme Rubber | DSM, DuPont Dow Exxon | Keltan ®, Engage ® Exact ® |
| Styrenic Copolyme Elastomer | JSR, Kraton, Kuraray | Dynaron ®, Kraton ® Septon ® |
| Stabilizers | Ciba, Cytex, Great Lake Chemicals | Irganox ®, Tinuvin ® Cyanox ®, Cyasorb ® |
| Powder Flow Additives | Southern Clay Products Nanocor | Cloisite ®, Nanomer ® |
| Polymer surface modifiers | Ciba, Croda, Dow Corning | Atmer ®, Crodamide ® UHMW Siloxane ® |

The thermoplastic polyolefin compositions further optionally comprise a color pigment or a combination of color pigments. Suitable color pigments are known to those skilled in the art and the exact amount of color pigment is readily empirically determined based on the desired color characteristic of the formulation and the finished product, with about 1 wt. % to about 2 wt. % possible.

The thermoplastic polyolefin composition may be prepared by melt blending the ingredients under high shear conditions, for example, using an internal mixer, such as Banbury type mixer, or by using a twin-screw extruder with screw elements selected to provide high shear for good distributive mixing of components. The resulting compositions may be processed further into smaller particles, such as pellets, micropellets, or powder, or any suitable form. The smaller particles of the compositions are particularly useful for slush molding to achieve uniform skin formation.

In one embodiment, as shown in FIG. 1, the process comprises forming the thermoplastic polyolefin ingredients 12, into pellets 16 by melt mixing 14 the ingredients 12. Melt mixing 14 may be accomplished by using an extruder, such as a twin screw extruder or an internal mixer, such as a Banbury type mixer. The pellets 16 may then undergo cryogenic pulverization 18 (pulverized at cryogenic temperature) to produce a powder 19, with an average particle size of about 75 to about 500 μm. Cryogenic pulverization 18 is a shearing/impact process which makes non-uniform particles. In an alternative embodiment, not shown herein, the process includes melt mixing the components using an extruder, such as a twin screw extruder, and further processing the resulting pellets 16 with an extruder, such as a single screw extruder, to produce micropellets 29.

Figure 2:
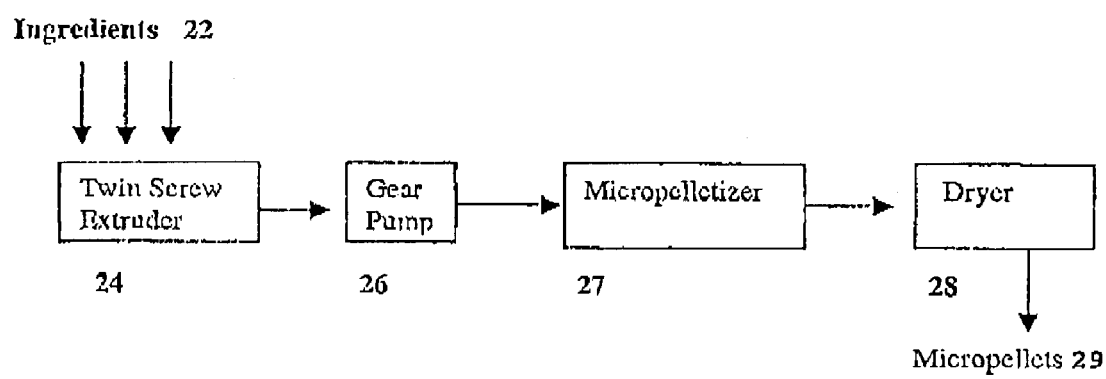
FIG. 2 is a schematic depiction of a process of In-line compounding thermoplastic polyolefin compositions to form particles such as micropellets in accordance with the present invention.

In another embodiment, as shown in FIG. 2, the process comprises forming micropellets 29, of the composition using a gear pump 26 as a means to achieve high backpressure from the twin-extruder 24 to the minibead die plate, which would eliminate a separate processing step. In this process, the ingredients 22 are melt compounded by in-line extrusion, using an extruder, such as a twin screw extruder 24 with a gear pump 26 to increase the melt pressure. The resulting composition is then formed into micropellets 29 of the composition, in a micropellitizer 27. Micropellets 29 of the composition may be processed in a dryer 28, such as a centrifugal dryer.

Micropellets 29 of the composition may be larger spherical particles than cryoground powder 19 particles, usually measuring in the range of about 350 to about 900 μm. Slush molding can be achieved using either the cryoground powder 19, the micropellets 29 of the composition or combinations of the two for forming articles of manufacture therefrom.

The process of slush molding may be successful when the powder 19 and/or micropellets 29 possess good mechanical flow within the forming tool during the rotation cycle. This property of mechanical flow can be quantified by measuring the time to empty a cup with an orifice at the bottom and with specific volume. The improved flow can be achieved by the addition of suitable powder flow additive such as inorganic particulate. Suitable powder flow additive includes hydrated silicate such as talc and montmorillonite clay. The powder flow additive may comprise up to about 10 wt. %, preferably about 3 wt. % to about 7 wt. %, of the total weight of the thermoplastic polyolefin composition. The particle size range of the silicate should be in the range of about 1 to about 40 μm and preferably in the range of about 1 to about 20 μm. These powder flow additive may be added during the melt compounding or as a secondary process during cryogrinding or mechanical mixing of the powder 19 and/or micropellets 29 with the powder flow additive.

EXAMPLES

The following examples illustrate the present invention. It is understood that these examples are given for the purpose of illustration and do not limit the invention. In the examples, all parts and percentages are by weight based on the total weight of the composition unless otherwise specified.

Example 1

Composition A was prepared by melt mixing 14 using a twin-screw extruder and converted by cryogenic pulverization 18 into powder 19 using the scheme shown in FIG. 1. The composition of A, in weight percent of total composition, consists of about 40 wt. % polypropylene polymer and about 60 wt. % styrene copolymer elastomer.

The composition A had a measured melt viscosity of 1800 Pa·s (18000 Poise) at 215° C., which is considered to be too high for suitable slush molding composition.

Example 2

Composition B was prepared by melt mixing using a twin-screw extruder 24 and converted to micropellets 29 using the scheme shown in FIG. 2. The composition of B, in weight percent of total composition, comprises about 60% polypropylene polymer and about 40 wt. % styrenic copolymer elastomer.

The composition B had a measured melt viscosity of 400 Pa·s (4000 Poise) at 215° C. The micropellets 29 had a measured flow of 27 seconds in a "Cup No. 5". The slush molded skin had inferior surface quality characterized by incomplete surface grain pattern, unacceptable pinholes, and incompletely fused rough back surface.

Example 3

Composition C was prepared by melt mixing 14 using a twin-screw extruder and converted by cryogenic pulverization 18 into powder 19 using the scheme shown in FIG. 1 and also converted to micropellets using the scheme shown in FIG. 2. The composition of C, in weight percent of total composition, comprises about 60% polypropylene polymer and about 40 wt. % styrenic copolymer elastomer.

The composition C had a measured melt viscosity of 400 Pa·s (4000 Poise) at 215° C. The micropellets 29 had a measured flow of 27 seconds in a "Cup No. 5". The slush molded skin made only from micropellets 29 had inferior surface quality characterized by incomplete surface grain pattern, unacceptable pinholes, and incompletely fused rough back surface. Mixtures of the micropellets 29 and powder 19 in the composition with ranges of about 20 wt. % to about 80 wt. % of the micropellets 29 produced skin with improved surface quality and reduced pinholes.

Example 4

Composition D was prepared by melt mixing 14 using a twin-screw extruder and converted by cryogenic pulverization 18 into powder 19 using the scheme shown in FIG. 1. The composition of D, in weight percent of total composition, comprises about 40 wt. % polypropylene, about 30 wt. % ethylene copolymer elastomer, and about 30% styrene copolymer elastomer.

To this composition was also added about 2 wt. % of a polymer surface modifiers and about 4 wt. % of a color concentrate consisting of stabilizers and colorants. The final composition D had a measured melt viscosity of 743 Pa·s (7430 Poise) at 215° C. The slush molded skin had inferior surface quality characterized by unacceptable pinholes.

Using the Ford 5-Finger Test for Unpainted Slush Molded Samples, with a 1 mm tip and applied loads of 2 to 7N, the skin had a scratch resistance rating of 1. This rating corresponds to no visible scratch mark.

Example 5

Composition E was prepared by melt mixing 14 using a twin-screw extruder and converted by cryogenic pulverization 18 into powder 19 using the scheme shown in FIG. 1. The composition of E, in weight percent of total composition, comprises about 30 wt. % polypropylene, about 40 wt. % ethylene copolymer elastomer, and about 30 wt. % styrene copolymer elastomer.

To this composition was also added about 2 wt. % of polymer surface modifier and about 4% of a color concentrate consisting of stabilizers and colorants. To the powder 19 was added about 4 wt. % of a hydrated silicate. The resulting powder had a measured flow of 6 seconds in a "Cup No. 5".

The final composition E had a measured melt viscosity of 650 Pa·s (6500 Poise) at 215° C. The surface quality of a slush molded skin was found to be good with minimal surface pinholes.

Using the Ford 5-Finger Test for Unpainted Slush Molded Samples, with a 1 mm tip and applied loads of 2 to 7N, the skin had a scratch resistance rating ranging from 1–2. This rating corresponds to no visible or a slight scratch mark.

The embodiments of the present compositions, process and articles made therefrom, although primarily described in relation to vehicle application such as interior sheathing, including instrument panel skins, door panels, air bag covers roof liners and seat covers, can be utilized in numerous automotive and non-automotive applications.

It will be understood that a person skilled in the art may make modifications to the particular embodiments described herein within the scope and intent of the claims. While the present invention has been described as carried out in specific embodiments thereof, it is not intended to be limited thereby, but is intended to cover the invention broadly within the scope and spirit of the claims.

What is claimed is:

1. A thermoplastic polyolefin composition comprising, based on the total weight of the composition, a melt blend of:
    about 20 wt. % to about 50 wt. % polypropylene or copolymer thereof;
    about 20 wt. % to about 60 wt. % styrenic elastomer; and
    an ethylene-propylene non-conjugated diene copolymer (EPDM) having an MFI of greater than 20 g/10 min;
    wherein the composition has a melt viscosity of about 50 Pa·s to less than 1800 Pa·s at a temperature of 180° C. to 260° C. measured at low shear rate by parallel plate rheometer.

2. The composition of claim 1 comprising up to about 30 wt. % EPDM.

3. The composition of claim 2, wherein said EPDM is chosen from a group consisting of ethylene-propylene norbornadiene and ethylenepropylene-1,4-hexadiene/norbornadiene copolymer and mixtures thereof.

4. The composition of claim 1, further comprising up to about 5 wt. % polymer additive.

5. The composition of claim 4, wherein said polymer additive comprises polymer sufface modifier.

6. The composition of claim 1, further comprising up to about 10 wt. % powder flow additive.

7. The composition of claim 6, wherein the powder flow additive is chosen from a group consisting of inorganic particulate, hydrated silicate, talc, and montmorillonite clay, and mixtures thereof.

8. The composition of claim 1, further comprising about 1 wt. % to about 4 wt. % stabilizer.

9. The composition of claim 1, wherein the polypropylene comprises a polypropylene olefin copolymer, wherein said polypropylene olefin copolymer comprises up to about 15 wt. % olefin based on the total weight of the polypropylene.

10. The composition of claim 1, wherein the styrenic elastomer comprises a saturated aliphatic hydrocarbon-styrene copolymer having a molecular styrene content below 50 wt. % based on the total weight of the styrenic elastomer.

11. The composition of claim 1, wherein the EPDM comprises about 60 wt. % to about 80 wt. % ethylene, based on the total weight of the EPDM.

12. An article of manufacture made from the composition of claim 1.

13. The composition of claim 1, having a melt viscosity of about 50 to about 650 Pa·s at a processing temperature of 180° C. to 260° C. measured at low shear rate by parallel plate rheometer.

14. The composition of claim 13, having a melt viscosity of about 50 to about 400 Pa·s at a processing temperature of about 180° C. to about 260° C. measured at low shear rate by parallel plate rheometer.

15. The composition of claim 14, having a melt viscosity of about 50 to about 250 Pa·s at a processing temperature of about 180° C. to about 260° C. measured at low shear rate by parallel plate rheometer.

16. The composition of claim 1, wherein the polypropylene or copolymer thereof has an MFI of about 60 to about 1,200 g/10 min.

17. The composition of claim 1, in the form of micropellets having an average size of about 350 to about 900 micrometers.

18. A thermoplastic polyolefin composition comprising, based on the total weight of the composition, a blend of:
about 20 wt. % to about 50 wt. % polypropylene or copolymer thereof;
about 20 wt. % to about 60 wt. % styrenic elastomer; and
an ethylene copolymer elastomer from the group consisting of ethylene-norbomadiene propylene norbornadiene ethylene-propylene 1,4-exadiene/norbornene copolymer and mixtures thereof.

19. The composition of claim 18, wherein the ethylene copolymer elastomer comprises about 15 wt. % to about 30 wt. %.

20. A thermoplastic polyolefin composition comprising, based on the total weight of the composition, a melt blend of:
about 20 wt. % to about 50 wt. % polypropylene or copolymer thereof; and about 20 wt. % to about 60 wt. % styrenic elastomer, wherein the composition has a low shear rate melt viscosity of less than 1800 Pa·s at a temperature of about 180° C. to about 260° C., and wherein the styrenic elastomer and the polypropylene or copolymer thereof each has a Melt Flow Index of greater than 20 grams/10 min. measured at 230° C. employing a 2.16 kilogram weight, wherein the composition is in the form of a mixture of a powder and micropellets.

21. The composition of claim 20, wherein the polypropylene or copolymer thereof has an MFI of about 60 to about 1,200 g/10 min.

22. The composition of claim 20, wherein the powder has an average particle size of about 75 to about 500 micrometers and the micropellets have an average size of about 350 to about 900 micrometers.

23. The composition of claim 20, wherein the low shear rate melt viscosity is about 50 Pa·s to less than 1800 Pa·s at a temperawre of about 180° C. to about 260°C.

24. A thermoplastic polyolefin composition comprising, based on the total weight of the composition, a melt blend of about 20 wt. % to about 50 wt. % polypropylene or copolymer thereof and about 20 wt. % to about 60 wt. % styrenic elastomer, wherein the composition is in the form of a mixture of a powder and between about 20 wt. % and 80 wt. % micropellets, wherein the powder has an average particle size of about 75 to about 500 micrometers and further wherein the micropellets are spherical particles having an average size of about 350 to about 900 micrometers.

25. A thermoplastic polyolefin composition comprising, based on the total weight of the composition, a melt blend of:
about 20 wt. % to about 50 wt. % polypropylene or copolymer thereof;
about 20 wt. % to about 60 wt. % styrenic elastomer; and
an ethylene-propylene non-conjugated diene copolymer (EPDM);
wherein the composition has a melt viscosity of about 50 Pa·s to less than 1800 Pa·s at a temperature of 180° C. to 260° C. measured at low shear rate by parallel plate rheometer, and is in the form of a mixture of a powder and micropellets.

26. The composition of claim 25, wherein the micropellets have an average size of about 350 to about 900 micrometers and the powder has an average particle size of about 75 to about 500 micrometers.

* * * * *